United States Patent Office 3,307,646
Patented Mar. 7, 1967

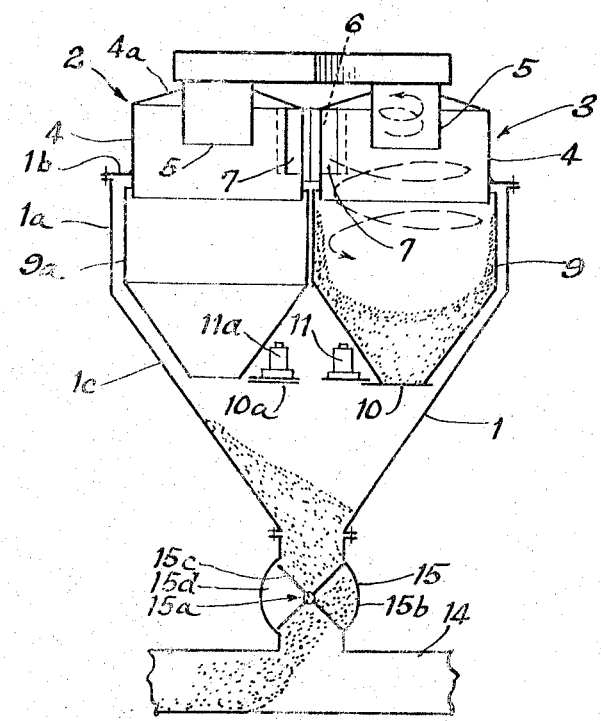
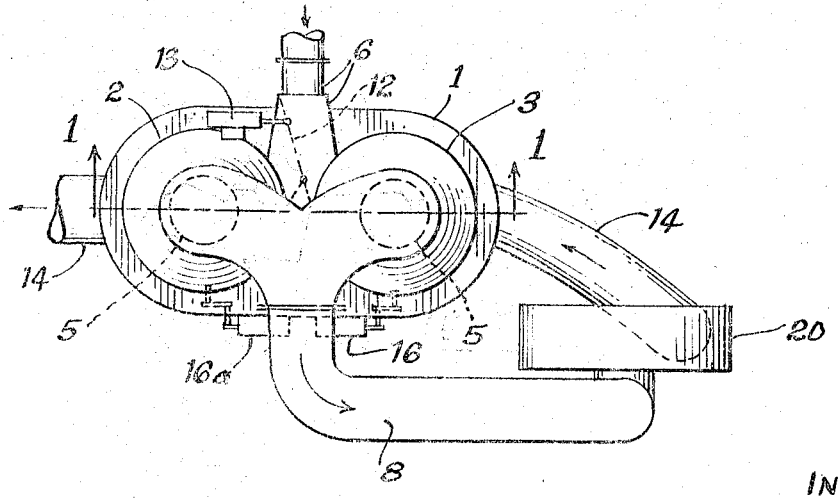

3,307,646
APPARATUS FOR WEIGHING MATERIALS IN THE COURSE OF PNEUMATIC HANDLING
Stanislas H. Hage, Nivelles, Belgium, assignor to DK Manufacturing Company, Batavia, Ill., a corporation of Illinois
Filed May 13, 1965, Ser. No. 455,520
Claims priority, application Belgium, May 26, 1964, 520,765, Patent 648,408
5 Claims. (Cl. 177—98)

The present invention relates to an installation or apparatus for the weighing of granular or other loose materials while they are acted upon pneumatically, as by air from a pump, fan, blower or similar device.

It is already known that granular or other loose materials may be transported pneumatically. Certain existing installations of this kind embody weighing systems, but all such weighing systems are very cumbersome in that they consist of systems of vats, troughs or hoppers which are superimposed, one above another.

The present invention now discloses how an installation or apparatus may be constructed in which weighing can be done continuously, yet in a manner which is not nearly so cumbersome as in the case of any installation known in the prior art.

In order to bring this about, the apparatus of the present invention comprises two or more cyclone type separators, each of which extends into the upper portion of a separate weighing vat or hopper. These cyclones are connected first of all to a conduit which feeds the granular material and the incoming air into the cyclones. The cyclones are also connected to the suction side of an air pump, vacuum blower or similar device. The conduit for feeding the material into the cyclones comprises a device with a valve or gate whereby the material may be supplied to the cyclones one after the other. Moreover, each of the weighing vats or hoppers comprises a shutoff device or valve at its lower end, whereby the material may be retained in the hopper for the purpose of weighing. Each weighing hopper is connected to a weighing device or scale. The weighing hoppers are located inside an outer jacket or casing into which the weighed material drops. The lower end of the outer casing is connected to the delivery conduit of the air pump through an air lock or feeder valve. The assembly formed by the outer casing, the weighing hoppers and the cyclones is operated with a subatmospheric pressure or partial vacuum therein. The provision of two or more such weighing hoppers makes it possible to carry on the weighing operation on a continuous basis, so that one hopper becomes emptied while the other becomes filled. In the case of three or more weighing hoppers, the hoppers are filled and emptied in turn.

Further details and features of the present invention will become apparent from the following description, which merely covers a typical example, as shown in the drawings, and does not limit the scope of the invention in any way. In the drawings:

FIG. 1 is a schematic elevational section of an installation or apparatus according to the present invention.

FIG. 2 is a schematic plan view of the same installation.

The apparatus or machine according to the present invention comprises an outer jacket or casing 1 having a cylindrical side wall 1a, a top wall 1b, and a downwardly tapering hopper bottom portion 1c. Two cyclones or separators 2 and 3 are provided at the top of the outer casing 1. As shown, each cyclone comprises a cylindrical chamber or housing 4 having a top wall 4a. An axially disposed tubular attachment pipe or flue 5 extends downwardly into each housing 4 through the top wall 4a thereof. Each housing 4 extends through the top wall 1b of the outer casing and is solidly secured to the top wall 1b. Each housing 4 has an open bottom communicating with the interior of the outer casing 1.

Each of the chambers or housings 4 is connected to an inlet pipe 6 which supplies the granular material, carried in a stream of air. Openings 7 are provided to connect the conduit 6 tangentially to the housings 4. The tubular attachment pipes or flues 5 are connected by means of a conduit 8 to the suction side of an air pump 20 or some other device, such as a rotary compressor, a turboblower or the like.

Independently movable weighing vats or hoppers 9a and 9 are provided below the cylindrical chambers or housings 4 of the cyclone separators 2 and 3, respectively. As already indicated, the housings 4 of the cyclone separators 2 and 3 are solidly connected to the outer casing 1, but the weighing hoppers 9 and 9a are independently mounted within the outer casing 1 so that the hoppers and the contents thereof may be independently weighed. The weighing hoppers 9 and 9a are disposed beneath the open bottom ends of the housings 4 so that the granular material from the housings 4 will drop into the hoppers 9 and 9a. Closing valves or gates 10 and 10a are provided at the bottom ends of the weighing hoppers 9 and 9a. The valves 10 and 10a are actuated by operating devices such as air motors or cylinders or other similar means 11 and 11a. The operating devices may be operated hydraulically or by electrical power, if desired.

The feed line or inlet conduit 6 for the incoming material to be weighed is provided with a diverting valve or sluice gate 12 which is actuated by an air cylinder or other operating device 13, so as to direct the incoming material into either the cyclone 2 or the cyclone 3 during the operation of the machine. In this way, the material may be directed alternately into the weighing hoppers 9 and 9a. The operaing device 13 may be hydraulically or electrically operated, if desired.

The weighing hoppers are connected to separate measuring or weighing devices or scales 16 and 16a, respectively.

The outer casing or jacket 1 is in the form of a downwardly tapering hopper. The lower end of the outer casing 1 is connected to the outlet or delivery conduit 14 of the air pump or blower 20, by means of an air lock or feeder valve 15. It will be understood that the valve 15 feeds the granular material from the lower end of the outer casing 1 into the air stream in the delivery conduit 14, while preventing any direct flow of air from the conduit 14 into the casing 1. The feeder valve 15 may comprise a rotor or wheel 15a which rotates in a cylindrical casing 15b. The wheel 15a has a plurality of vanes 15c with pockets 15d therebetween for carrying the granular material between the casing 1 and the delivery conduit 14.

The operation of the machine or installation is as follows:

The operation of the air pump or blower 20 produces suction whereby granular material may be drawn into the conduit 6, along with a stream of air. The conduit 6 carries the materia lto one of the cyclone separators 2 and 3 and thence to one of the weighing hoppers 9 and 9a. As shown in FIG. 2, the valve or gate 12 is adjusted so that it directs the material into the cyclone 3 which corresponds to the weighing hopper 9. In the cyclone 3, the air is caused to whirl and then is drawn out of the cyclone through the axial pipe or flue 5. The air then passes through the pipe 8 to the suction side of the blower 20. Centifugal force on the whirling granular material prevents it from being drawn into the axial pipe 5. Due to its weight, the granular material drops into the weighing hopper 9, the lower valve 10 of which is closed.

The weighing device or scale 16 indicates the amount of material in the weighing vat 9. When the desired weight has been reached, the operating device or motor 13 is activated so as to shift the valve or gate 12 into its other position, so that the incoming granular material will be diverted into the other cyclone separator 2. The weight of the material in the hopper 9 is then noted or recorded. The valve or gate 10 is then opened by activating the operating motor 11. The material in the weighing hopper 9 thereupon drops into the bottom portion of the outer casing 1, from which it is fed or metered into the delivery conduit 14 by the air lock or feeder valve 15. The granular material is picked up in the delivery conduit 14 by the air stream from the blower 20 and is carried to a desired location for storage or to fill any desired container or receptacle.

After the material has flowed from the weighing hopper 9 into the outer casing 1, the valve 10 is closed so that the weighing hopper 9 will be ready to receive another charge of the material.

The valve or gate 10a of the weighing hopper 9a is closed when the valve or gate 12 is shifted so as to direct the incoming material into the cyclone 2, and thence into the weighing hopper 9a. Thus, the valve 10a retains the material in the hopper 9a until the desired weight is noted on the scale 16a. The valve or gate 12 is then shifted back to the position in which it directs the incoming material into the weighing hopper 9.

In this way, the weighing operation can readily be carried out on a continuous basis, by using the hopper 9 and 9a alternately, so that each hopper is filled and emptied in turn. It will be understood that more than two weighing hoppers may be provided. In that case, the operation would be similar, in that one or more hoppers would be in the process of being filled while at the same time one or more other hoppers would be in the process of being emptied.

The various valves or gates may be operated or controlled manually, but it will be apparent that provision may be made for automatic operation of these valves in a predetermined order, so that the lower valve of each weighing hopper will be closed before the diverting valve of the material supply conduit is shifted toward such hopper. The automatic operations may be tied in with the weighing devices or scales, so that the valves will be actuated by the scales in such a manner that the diverting valve will be shifted when a predetermined weight of the material is dropped into each weighing hopper.

The automatic control system may also be constructed and arranged so that the lower valve of each weighing hopper will not be opened until the weighing operation has been completed and the weight shown by the scales has been noted or recorded.

Various other modifications, alternative constructions and equivalents may be employed without departing from the true spirit and scope of the invention, as exemplified in the foregoing description and defined in the following claims.

I claim:
1. In an installation for the weighing of materials during the course of pneumatic handling thereof,
   the combination comprising a plurality of cyclone separators,
   a plurality of weighing hoppers disposed beneath the corresponding cyclone separators,
   a supply conduit connected to said cyclone separators for supplying the material thereto,
   an air pump,
   each of said cyclone separators having an axial flue pipe connected to the suction side of said air pump,
   said supply conduit comprising a diverted valve for conducting said supply conduit to each of said cyclone separators in turn,
   each of said weighing hoppers comprising a shut off valve at the lower end thereof for retaining the material therein so that it may be weighed,
   a weighing device connected to each of said weighing hoppers,
   an outer casing mounted around said weighing hoppers and enclosing said weighing hoppers and said cyclone separators for receiving the weighed material from said weighing hoppers,
   a delivery conduit connected to the pressure side of said air pump,
   means connected between the lower end of said outer casing and said delivery conduit for feeding the material from said casing into said delivery conduit,
   said weighing hoppers and the interior of said outer casing and said cyclone separators being maintained at a subatmospheric pressure by the suction developed by said air pump,
   said weighing hoppers being adapted to be filled in turn and emptied in turn so that one hopper is being filled while another is being emptied.
2. The combination of claim 1,
   comprising means for actuating said diverting valve and said shut off valve in a preselected order so that the shut off valve of each weighing hopper is closed before the diverting valve is directed toward the corresponding weighing hopper,
   and so that each shut off valve is opened only after the weighing operation is completed.
3. In a machine for weighing materials while being transported pneumatically in an air stream,
   the combination comprising a closed outer casing,
   a plurality of cyclone separators mounted on the upper portion of said casing for receiving the material and separating the material from its entraining air stream,
   an air pipe connected to each of said saparators for removing the separated air therefrom,
   an inlet conduit for supplying the incoming material and the entraining air stream to said cyclone separators,
   said inlet conduit having a diverting valve for directing the incoming material into the cyclone separators in sequence,
   a plurality of weighing hoppers mounted independently within said outer casing and beneath said cyclone separators for receiving the separated material therefrom,
   each of said weighing hoppers having a shut off valve for retaining the material therein for weighing,
   a plurality of scales for weighing said hoppers,
   said outer casing having a hopper bottom portion for receiving the weighed material from said weighing hoppers when said shut off valves are opened,
   and means for feeding the material out of the lower end of said outer casing.
4. In a pneumatic materials handling machine for weighing materials while they are being transported in an air stream,
   the combination comprising a closed casing,
   a plurality of cyclone separators mounted on the upper portion of said casing,
   an inlet conduit for supplying material and an entraining air stream to said separators,
   said inlet conduit having a diverting valve for directing the material and the entraining air into each of said separators in turn,
   each separator being effective to separate the material from the entraining air,
   each separator having an air pipe connected thereto for withdrawing the separated air therefrom,
   an air pump,
   a suction conduit connecting said air pipes to the suction side of said air pump, the interior of said cyclone separators and the interior of said casing thereby being maintained at a subatmospheric pressure, each of said separators having an open bottom communicating with the interior of said casing, a plurailty of weighing hoppers mounted independently in said casing and beneath said open bottoms of said cyclone separators for receiving the separated material therefrom, each of said weighing hoppers having a shut off valve for retaining the material therein for weighing, a plurality of scales for weighing each of said weighing hoppers and the material therein, said casing having a hopper bottom portion for receiving the weighed material from said weighing hoppers when said shut off valves are opened, a delivery conduit connected to the discharge side of said air pump for carrying the outgoing stream of air therefrom, and a rotary feeder valve connected between the lower end of said casing and said delivery conduit for feeding the material into said conduit from said casing while preventing any direct flow of air into said casing, said weighing hoppers being maintained at the sub-atmosphere pressure existing within said casing, said diverting valve and said shut off valves being operable to fill and empty said weighing hoppers in sequence so as to provide continuous weighing of the material.

5. In a penumatic handling machine for weighing material while being transported in an air stream, the combination comprising a closed casing, a plurality of cyclone separators mounted on the upper portion of said casing, an inlet conduit for supplying material and an entraining air stream to said separators, said inlet conduit having a diverting valve for directing the material and the entraining air into each of said separators in turn, each separator being effective to separate the material from the entraining air, each separator having an air pipe connected thereto for withdrawing the separated air therefrom, an air pump, a suction conduit connecting said air pipes to the suction side of said air pump, the interior of said cyclone separators and the interior of said casing thereby being maintained at a subatmospheric pressure, each of said separators having an open bottom communicating with the interior of said casing, a plurality of weighing hoppers mounted independently in said casing and beneath said open bottoms of said cyclone separators for receiving the separated material therefrom, each of said weighing hoppers having a shut off valve for retaining the material therein for weighing, a plurality of scales for weighing each of said weighing hoppers and the material therein, said casing having a hopper bottom portion for receiving the weighed material from said weighing hoppers when said shut off valves are opened, a delivery conduit connected to the discharge side of said air pump for carrying the outgoing stream of air therefrom, and means connected between the lower end of said casing and said delivery conduit for feeding the material into said delivery conduit from said casing while preventing any direct flow of air into said casing, said weighing hoppers being maintained at the sub-atmospheric pressure existing within said casing, said diverting valve and said shut off valves being operable to fill and empty said weighing hoppers in sequence so as to provide continuous weighing of the material.

No references cited.

RICHARD B. WILKINSON, *Primary Examiner.*

G. H. MILLER, *Assistant Examiner.*